(12) United States Patent
Kamijo (10) Patent No.: US 8,926,164 B2
(45) Date of Patent: Jan. 6, 2015

(54) MIXER TRUCK WITH DRUM ROTATION UNEVENNESS DETERMINATION

(75) Inventor: Takashi Kamijo, Fukaya (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 14/342,355

(22) PCT Filed: Aug. 28, 2012

(86) PCT No.: PCT/JP2012/071670
§ 371 (c)(1),
(2), (4) Date: Feb. 28, 2014

(87) PCT Pub. No.: WO2013/031759
PCT Pub. Date: Mar. 7, 2013

(65) Prior Publication Data
US 2014/0198599 A1    Jul. 17, 2014

(30) Foreign Application Priority Data

Sep. 2, 2011    (JP) .................................. 2011-191520

(51) Int. Cl.
*B28C 5/42*    (2006.01)
*B60P 3/16*    (2006.01)

(52) U.S. Cl.
CPC . *B28C 5/422* (2013.01); *B60P 3/16* (2013.01); *B28C 5/4213* (2013.01); *B28C 5/4231* (2013.01)
USPC .......................................................... 366/61

(58) Field of Classification Search
CPC ........ B28C 5/42; B28C 5/4203; B28C 5/421; B28C 5/4213; B28C 5/4217; B28C 5/422; B60P 3/16

USPC .................. 366/53–60, 61, 62, 63, 232–233; 60/462–465, 422, 452, 459
See application file for complete search history.

(56) References Cited

U.S. PATENT DOCUMENTS 5,746,509 A * 5/1998 Gebhard et al. ................ 366/61
6,074,083 A * 6/2000 Gebhard et al. ................ 366/61
(Continued)

FOREIGN PATENT DOCUMENTS

EP    2496294 A  * 5/2013
EP    2752279 A1 * 7/2014
(Continued)

OTHER PUBLICATIONS

International Search Report mailed Nov. 13, 2012, in corresponding International Application No. PCT/JP2012/071670.

*Primary Examiner* — Charles Cooley
(74) *Attorney, Agent, or Firm* — Lowe Hauptman & Ham, LLP (57) ABSTRACT

A mixer truck includes: a mixer drum capable of carrying ready-mixed concrete; a driving device that drives the mixer drum to rotate using an oil pressure of a working oil; a pressure sensor that detects a driving condition of the mixer drum driven by the driving device; a controller that determines a magnitude of rotation unevenness in the mixer drum by comparing a magnitude of variation in the driving condition detected by the pressure sensor with a predetermined set value after the ready-mixed concrete in the mixer drum has been discharged; and a notifying device that notifies a driver that the magnitude of the rotation unevenness in the mixer drum has reached an allowable value when the controller determines that the magnitude of the variation in the driving condition detected by the pressure sensor has reached the set value.

4 Claims, 5 Drawing Sheets

(56) References Cited

U.S. PATENT DOCUMENTS

| | | | |
|---|---|---|---|
| 6,286,987 B1* | 9/2001 | Goode et al. | 366/60 |
| 7,740,396 B2* | 6/2010 | Ross et al. | 366/2 |
| 7,866,875 B2* | 1/2011 | Abe et al. | 366/61 |
| 8,020,431 B2* | 9/2011 | Cooley et al. | 73/54.03 |
| 8,104,947 B2* | 1/2012 | Ando et al. | 366/54 |
| 8,118,473 B2* | 2/2012 | Compton et al. | 366/17 |
| 2007/0185636 A1* | 8/2007 | Cooley et al. | 701/50 |
| 2007/0247964 A1* | 10/2007 | Ross et al. | 366/61 |
| 2007/0280035 A1* | 12/2007 | Abe et al. | 366/31 |
| 2008/0008025 A1* | 1/2008 | Abe et al. | 366/61 |
| 2009/0171595 A1* | 7/2009 | Bonilla Benegas | 702/41 |
| 2009/0282824 A1* | 11/2009 | Ando et al. | 60/449 |
| 2010/0312406 A1* | 12/2010 | Cooley et al. | 700/285 |
| 2013/0021867 A1* | 1/2013 | Shimizu | 366/40 |
| 2013/0111892 A1* | 5/2013 | Takahashi | 60/459 |
| 2014/0198599 A1* | 7/2014 | Kamijo | 366/61 |

FOREIGN PATENT DOCUMENTS

| | | | | |
|---|---|---|---|---|
| GB | 2103339 A | * | 2/1983 | F16H 39/46 |
| JP | 5-318456 A | | 12/1993 | |
| JP | 2005-199859 A | | 7/2005 | |
| JP | 2010-228505 A | | 10/2010 | |

* cited by examiner

MIXER TRUCK WITH DRUM ROTATION UNEVENNESS DETERMINATION

RELATED APPLICATIONS

The present application is a National Phase of International Application Number PCT/JP2012/071670, filed Aug. 28, 2012, which claims priority to Japanese Application Number 2011-191520, filed Sep. 2, 2010.

TECHNICAL FIELD

This invention relates to a mixer truck.

BACKGROUND ART

A mixer truck having a mixer drum that is capable of carrying ready-mixed concrete is used conventionally.

JP2005-199859A discloses a mixer truck having a washing nozzle capable of injecting washing water into a mixer drum. In this mixer truck, ready-mixed concrete adhered to an interior of the mixer drum is washed away by injecting the washing water through the washing nozzle.

SUMMARY OF INVENTION

However, even when a washing function such as that of the mixer truck described in JP2005-199859A is provided, it remains difficult to remove the ready-mixed concrete adhered to the mixer drum completely. Therefore, the ready-mixed concrete that could not be removed may harden within the mixer drum. Hardened concrete adhered to the mixer drum must be removed periodically by an operation known as chipping, but since it is impossible to see detailed portions of the mixer drum interior, it is difficult to determine whether or not concrete removal is required.

This invention has been designed in consideration of the problem described above, and an object thereof is to provide a mixer truck which is capable of notifying a driver of the need to remove hardened concrete adhered to an interior of a mixer drum.

According to one aspect of this invention, a mixer truck having a mixer drum that is capable of carrying ready-mixed concrete is provided. The mixer truck includes: a driving device that is configured to drive the mixer drum to rotate using a fluid pressure of a working fluid; a driving condition detector that is configured to detect a driving condition of the mixer drum driven by the driving device; a controller that is configured to determine a magnitude of rotation unevenness in the mixer drum by comparing a magnitude of variation in the driving condition detected by the driving condition detector with a predetermined set value after the ready-mixed concrete in the mixer drum has been discharged; and a notifying device that is configured to notify a driver that the magnitude of the rotation unevenness in the mixer drum has reached an allowable value when the controller determines that the magnitude of the variation in the driving condition detected by the driving condition detector has reached the set value.

The details as well as other features and advantages of this invention are set forth in the remainder of the specification and are shown in the accompanying drawings.

DESCRIPTION OF EMBODIMENTS

A mixer truck 100 according to an embodiment of this invention will be described below with reference to the figures.

First, referring to FIGS. 1 and 2, an overall configuration of the mixer truck 100 will be described.

Figure 1:
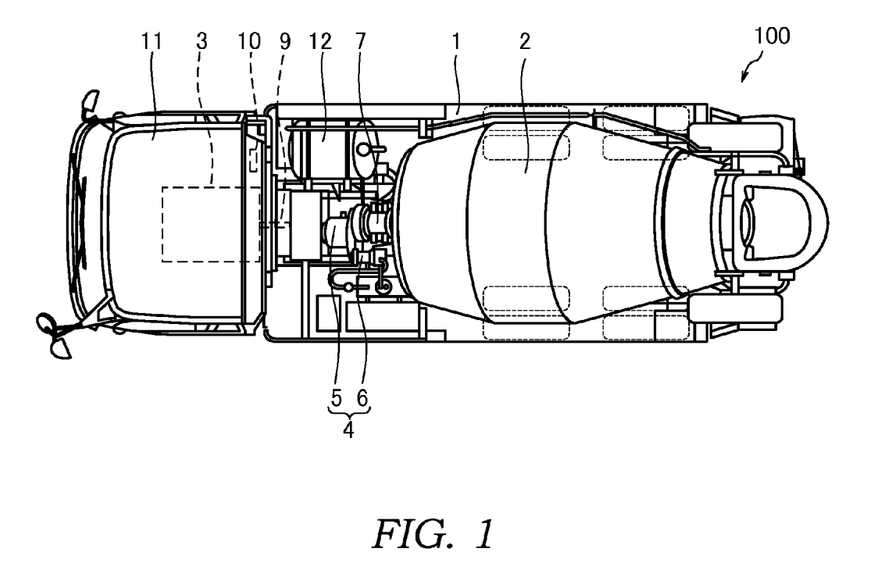
FIG. 1 is a plan view of a mixer truck according to an embodiment of this invention.

As shown in FIG. 1, the mixer truck 100 is a vehicle having a driver's cab 11 and a frame 1. The mixer truck 100 includes a mixer drum 2 that is carried on the frame 1 to be capable of carrying ready-mixed concrete, a driving device 4 that drives the mixer drum 2 to rotate, and a controller 10 that controls rotation of the mixer drum 2. The mixer truck 100 transports the ready-mixed concrete carried in the mixer drum 2.

The mixer drum 2 is a closed-end cylinder-shaped container carried rotatably on the frame 1. The mixer drum 2 is carried such that a rotary axis thereof is oriented in a front-rear direction of the vehicle. The mixer drum 2 is carried at a front-rear incline so as to rise gradually toward a rear portion of the vehicle.

An opening portion is formed in a rear end of the mixer drum 2, and the ready-mixed concrete can be introduced and discharged through the opening portion. The mixer drum 2 is driven to rotate using a travel engine 3 installed in the mixer truck 100 as a power supply.

The driving device 4 is driven by rotation of the engine 3 to drive the mixer drum 2 to rotate using a fluid pressure of a working fluid. A rotary motion of a crankshaft in the engine 3 is transmitted to the driving device 4 by a power take-off (PTO) 9 that extracts power from the engine 3 continuously, and a drive shaft 8 (see FIG. 2) that couples the power take-off 9 to the driving device 4.

Figure 2:
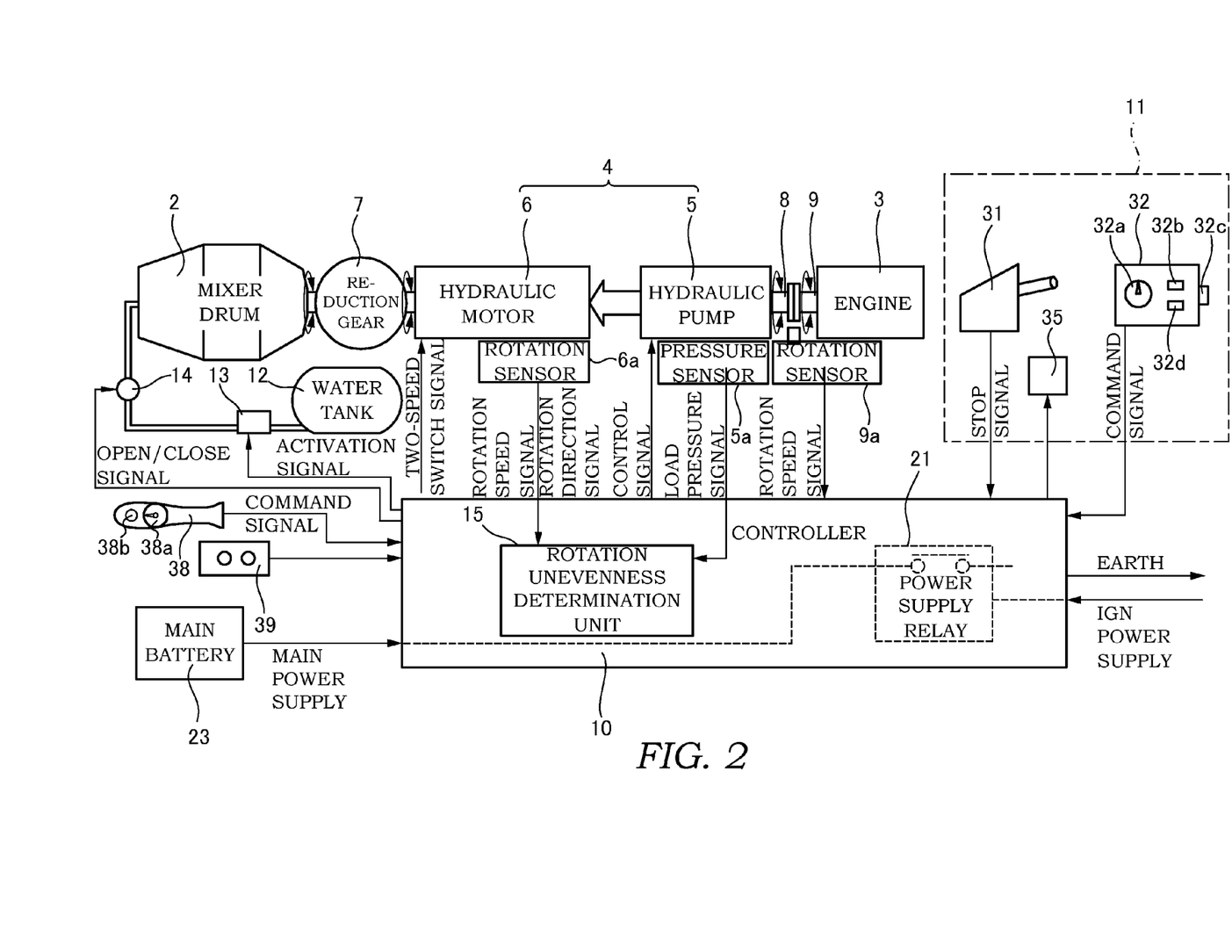
FIG. 2 is a control block diagram of the mixer truck.

As shown in FIG. 2, the power take-off 9 is provided with a rotation sensor 9a that detects a rotation speed thereof and outputs a rotation speed signal corresponding to the detected rotation speed to the controller 10. A rotation speed of the drive shaft 8 may also be detected using the rotation sensor 9a.

Working oil is used in the driving device 4 as the working fluid. It should be noted that another incompressible fluid may be used as the working fluid instead of working oil. As shown in FIG. 1, the driving device 4 includes a hydraulic pump 5 serving as a fluid pressure pump that is driven by the engine 3 to discharge the working fluid, and a hydraulic motor 6 serving as a fluid pressure motor that is driven by the hydraulic pump 5 to drive the mixer drum 2 to rotate. The driving device 4 can rotate the mixer drum 2 normally and in reverse, and can increase and reduce a rotation speed of the mixer drum 2.

The hydraulic pump 5 is driven to rotate by the power extracted continuously from the engine 3 via the power take-off 9. A rotation speed of the hydraulic pump 5 is therefore greatly affected by variation in the rotation speed of the engine 3 accompanying variation in a travel condition of the vehicle. Hence, in the mixer truck 100, operations of the hydraulic pump 5 and the hydraulic motor 6 are controlled by the controller 10 so that the mixer drum 2 achieves a target rotation condition in accordance with the rotation speed of the engine 3.

The hydraulic pump 5 is a variable capacity swash plate-type axial piston pump. A tilt angle of the hydraulic pump 5 is switched to a normal rotation direction or a reverse rotation direction upon reception of a control signal from the controller 10. The hydraulic pump 5 includes a solenoid valve for adjusting the tilt angle. By switching the solenoid valve, a discharge direction and a discharge capacity of the hydraulic pump 5 are adjusted.

The working oil discharged from the hydraulic pump 5 is supplied to the hydraulic motor 6 in order to rotate the hydraulic motor 6. The mixer drum 2 is coupled to the hydraulic motor 6 via a reduction gear 7. Hence, the mixer drum 2 rotates in accordance with the rotation of the hydraulic motor 6.

When the mixer drum 2 is operated by the hydraulic pump 5 to rotate normally, the ready-mixed concrete in the mixer drum 2 is agitated. When the mixer drum 2 is operated by the hydraulic pump 5 to rotate in reverse, on the other hand, the ready-mixed concrete in the mixer drum 2 is discharged to the outside through the opening portion in the rear end. The hydraulic pump 5 is provided with a pressure sensor 5a (see FIG. 2) serving as a pressure detector that detects a pressure of the discharged working oil.

As shown in FIG. 2, the pressure sensor 5a outputs a load pressure signal to the controller 10 in accordance with the detected pressure of the working oil. It should be noted that instead of providing the pressure sensor 5a in the hydraulic pump 5, the pressure sensor 5a may be provided in the hydraulic motor 6 in order to detect the pressure of the working oil in the hydraulic motor 6. Hence, the pressure sensor 5a detects the pressure of the working oil in the driving device 4.

The hydraulic motor 6 is a variable capacity swash plate-type axial piston motor. The hydraulic motor 6 is driven to rotate upon reception of the supply of working oil discharged from the hydraulic pump 5. The hydraulic motor 6 includes a solenoid valve that adjusts a tilt angle of the motor upon reception of a two-speed switch signal from the controller 10. By switching the solenoid valve, a capacity of the hydraulic motor 6 is switched between two stages, namely a small capacity for high speed rotation and a large capacity for normal rotation. The hydraulic motor 6 is provided with a rotation sensor 6a (see FIG. 2) serving as a rotation speed detector that detects a rotation speed thereof.

As shown in FIG. 2, the rotation sensor 6a detects a rotation direction and the rotation speed of the hydraulic motor 6, and outputs a rotation direction signal and a rotation speed signal to the controller 10.

Here, in FIG. 2, the pressure sensor 5a that detects the discharge pressure of the hydraulic pump 5 is used as a driving condition detector. The pressure sensor 5a and the rotation sensor 6a that detects the rotation speed of the hydraulic motor 6 are both used to detect a driving condition of the mixer drum 2 driven by the driving device 4. Variation in the driving condition indicates variation in various conditions relating to rotational driving of the mixer drum 2 by the driving device 4, such as variation in the discharge pressure of the hydraulic pump 5 that drives the mixer drum 2 to rotate and variation in the rotation speed of the hydraulic motor 6 that drives the mixer drum 2 to rotate.

Accordingly, the rotation sensor 6a may also be used as the driving condition detector. In other words, in the mixer truck 100, at least one of the pressure sensor 5a and the rotation sensor 6a is used as the driving condition detector.

The controller 10 is used to control the driving device 4, and is constituted by a microcomputer having a CPU (Central Processing Unit), a ROM (Read-Only Memory), a RAM (Random Access Memory), an I/O interface (Input/Output interface), and so on. The RAM stores data used in processing executed by the CPU. A control program for the CPU and so on are stored in the ROM in advance. The I/O interface is used to input and output information into and from connected devices. Control of the driving device 4 is realized by operating the CPU, the RAM, and so on in accordance with the program stored in the ROM.

As shown in FIG. 2, an ignition power supply is input into the controller 10 when a driver starts the engine 3 by operating an ignition switch provided in the driver's cab 11. Accordingly, a power supply relay 21 is switched such that a main power supply from a main battery 23 is supplied to the controller 10, and as a result, the controller 10 is driven.

The mixer truck 100 further includes a water tank 12 storing water, a water pressure pump 13 that suctions and discharges the water in the water tank 12, and an open/close valve 14 provided between the water pressure pump 13 and the mixer drum 2.

The water pressure pump 13 and the open/close valve 14 are provided in a supply passage for supplying water from the water tank 12 into the mixer drum 2. The water pressure pump 13 is activated by an activation signal from the controller 10. The open/close valve 14 is opened and closed by an open/close signal from the controller 10.

The water in the water tank 12 is supplied to the mixer drum 2 by activating the water pressure pump 13 and switching the open/close valve 14 to an open condition. The water in the water tank 12 can be replenished with water from an external water supply at a plant or the like.

Next, referring to FIG. 2, control performed in the mixer truck 100 will be described.

The controller 10 controls the operations of the hydraulic pump 5 and the hydraulic motor 6 in accordance with a calculated rotation speed of the engine 3 such that the rotation direction and the rotation speed of the mixer drum 2 correspond to the target rotation condition. More specifically, the controller 10 ensures that the rotation direction and the rotation speed of the mixer drum 2 correspond to the target rotation condition by calculating the discharge direction and the discharge capacity of the hydraulic pump 5 and the capacity of the hydraulic motor 6, and outputting a control signal to the hydraulic pump 5 and the two-speed switch signal to the hydraulic motor 6.

The load pressure signal is input into the controller 10 from the hydraulic pump 5 via the pressure sensor 5a, and the rotation direction signal and rotation speed signal are input into the controller 10 from the hydraulic motor 6 via the rotation sensor 6a. On the basis of these input signals, the controller 10 controls the operations of the hydraulic pump 5 and the hydraulic motor 6.

The controller 10 includes a rotation unevenness determination unit 15 that determines a magnitude of rotation unevenness in the mixer drum 2 following discharge of the ready-mixed concrete in the mixer drum 2, or in other words in a condition where the ready-mixed concrete in the mixer drum 2 has been completely discharged. The rotation unevenness of the mixer drum 2 will be described in detail below with reference to FIGS. 3A to 4.

The rotation unevenness determination unit 15 determines the magnitude of the rotation unevenness in the mixer drum 2 by comparing a magnitude of the driving condition detected by the driving condition detector with a set value set in advance. More specifically, the rotation unevenness determination unit 15 determines the rotation unevenness as follows.

When the pressure sensor 5a is used as the driving condition detector, the rotation unevenness determination unit 15 determines the magnitude of the rotation unevenness in the mixer drum 2 by comparing a magnitude of variation in the discharge pressure of the hydraulic pump 5, detected by the pressure sensor 5a, with a predetermined set value.

The set value used at this time is a set pressure variation width, which is set in advance on the basis of an allowable value of the magnitude of the rotation unevenness in the mixer drum 2, and serves as a magnitude of variation in the working oil pressure detected by the pressure sensor 5a. The rotation unevenness determination unit 15 determines whether or not the magnitude of the pressure variation detected by the pressure sensor 5a as the mixer drum 2 rotates has reached the set pressure variation width.

When the rotation sensor 6a is used as the driving condition detector, on the other hand, the rotation unevenness determination unit 15 determines the magnitude of the rotation unevenness in the mixer drum 2 by comparing a magnitude of variation in the rotation speed of the hydraulic motor 6, detected by the rotation sensor 6a, with a set value set in advance.

The set value used at this time is a set rotation speed variation width, which is set in advance on the basis of the allowable value of the magnitude of the rotation unevenness in the mixer drum 2, and serves as the magnitude of the variation in the rotation speed of the hydraulic motor 6 detected by the rotation sensor 6a. The rotation unevenness determination unit 15 determines whether or not the magnitude of the rotation speed variation detected by the rotation sensor 6a as the mixer drum 2 rotates has reached the set rotation speed variation width.

A parking brake 31, an operating device 32 for operating the mixer drum 2, and a notifying device 35 for providing the driver with notifications are disposed in the driver's cab 11.

The parking brake 31 is provided with a detector that detects a lever position of the parking brake 31. When the parking brake 31 is engaged, a stop signal is output to the controller 10 from the detector.

The operating device 32 is provided with a knob type operating switch 32a for switching the rotation direction and rotation speed of the mixer drum 2, a stop switch 32b for stopping the mixer drum 2 from rotating in an emergency, an automatic agitation switch 32c for automatically rotating the mixer drum 2 for the purpose of agitation, and an adhesion determination mode switch 32d for determining whether or not hardened concrete adhered to the mixer drum 2 has reached an allowable value.

Command signals are output to the controller 10 from the operating device 32 on the basis of operations performed on the respective switches 32a to 32d by the driver. On the basis of the command signals, the controller 10 determines the target rotation condition, or more specifically the rotation direction and the rotation speed, of the mixer drum 2.

A rotation operation of the mixer drum 2 will now be described. When the automatic agitation switch 32c is ON, the stop signal has not been output from the parking brake 31, and a vehicle speed is equal to or higher than a predetermined speed, the controller 10 determines that the vehicle is traveling. Accordingly, the controller 10 rotates the mixer drum 2 automatically for the purpose of agitation, thereby preventing discharge of the ready-mixed concrete and maintaining a quality of the ready-mixed concrete.

When the automatic agitation switch 32c is OFF, on the other hand, the controller 10 can operate the operating device 32 to rotate the mixer drum 2 in reverse even while the vehicle travels. In so doing, the ready-mixed concrete in the mixer drum 2 can be discharged to the outside while the vehicle travels at an extremely low speed, whereby the ready-mixed concrete can be supplied to an elongated groove or the like, for example. The controller 10 can also operate the operating device 32 to rotate the mixer drum 2 in reverse when the stop signal has been output from the parking brake 31, whereby the ready-mixed concrete in the mixer drum 2 can be discharged to the outside.

The notifying device 35 notifies the driver that the magnitude of the rotation unevenness in the mixer drum 2 has reached the allowable value on the basis of the determination made by the rotation unevenness determination unit 15 when the magnitude of the variation in the discharge pressure of the hydraulic pump 5 reaches the set value. The notifying device 35 is a buzzer that notifies the driver using sound, a lamp that notifies the driver visually, or the like.

A rear portion operating device 38 with which the mixer drum 2 can be operated from the exterior of the mixer truck 100 is disposed on the rear portion of the mixer truck 100. Similarly to the operating device 32, the rear portion operating device 38 includes a knob type operating switch 38a for switching the rotation direction and rotation speed of the mixer drum 2, and a stop switch 38b for stopping the mixer drum 2 from rotating in an emergency. A command signal is output to the controller 10 from the rear portion operating device 38 on the basis of an operation of the rear portion operating device 38 by the driver.

The mixer truck 100 is further provided with an automatic washing/mixing operating device 39 with which an automatic washing operation and a ready-mixed concrete mixing operation can be performed inside the mixer drum 2 from the exterior of the mixer truck 100.

Next, referring to FIGS. 3A and 3B, adhesion of concrete 40 to the mixer drum 2 will be described.

Figure 3A:
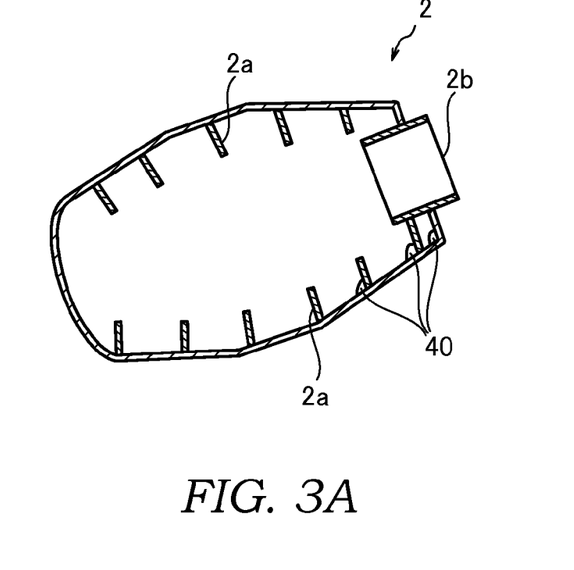
FIG. 3A is a side sectional view showing a mixer drum of the mixer truck in a condition where ready-mixed concrete is adhered thereto.
Figure 3B:
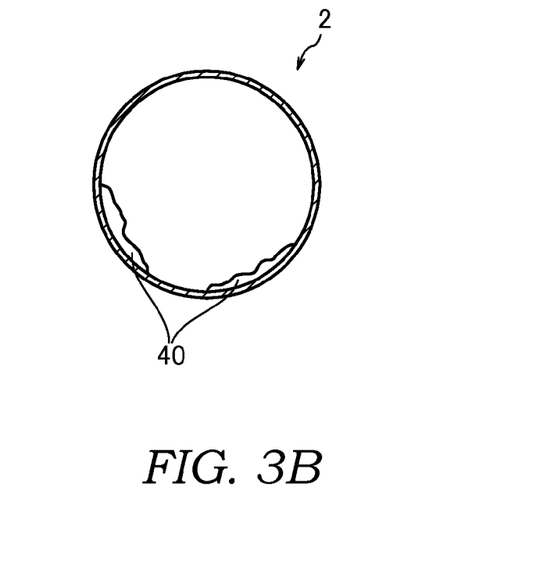
FIG. 3B is a front sectional view of FIG. 3A.

As shown in FIG. 3, blades 2a formed in a double spiral shape are provided in the mixer drum 2, and an opening portion 2b is formed in a rear end portion of the mixer drum 2. Therefore, when the mixer drum 2 is operated to rotate in reverse, the ready-mixed concrete in the mixer drum 2 can be discharged to the outside through the opening portion 2b.

The driver, after completely discharging the ready-mixed concrete in the mixer drum 2 by operating the mixer drum 2 to rotate in reverse, washes the interior of the mixer drum 2 by introducing water. Automatic washing may be performed by controlling the supply of water to the mixer drum 2 from the water tank 12 and the rotation of the mixer drum 2 using the controller 10 shown in FIG. 2.

However, it is difficult to see into the corners of the interior of the mixer drum 2 through the opening portion 2b. As shown in FIG. 3B, the ready-mixed concrete adheres to an inner periphery of the mixer drum 2, and it may therefore be impossible to see the adhered ready-mixed concrete through the opening portion 2b. Hence, as shown in FIG. 3A, ready-mixed concrete may remain adhered behind the blades 2a and so on even after the interior of the mixer drum 2 has been washed.

The ready-mixed concrete adhered to the mixer drum 2 hardens over time to form the concrete 40. When the concrete 40 is adhered to the mixer drum 2, a capacity of the mixer drum 2 decreases, leading to a reduction in an amount of ready-mixed concrete that can be carried in the mixer drum 2. Further, the hardened concrete 40 may narrow a passage for discharging the ready-mixed concrete, thereby obstructing discharge of the ready-mixed concrete. Therefore, the hardened concrete 40 adhered to the mixer drum 2 must be removed periodically by performing an operation known as chipping, in which the concrete 40 is scraped away manually.

Conventionally, the concrete 40 is removed on the basis of the elapse of time, for example once every several months, or a number of ready-mixed concrete transportation operations. These methods are not based on the actual amount of hardened concrete 40 in the mixer drum 2. Therefore, a removal operation may be performed even though the amount of hardened concrete 40 in the mixer drum 2 is small, or the mixer drum 2 may continue to be used even though the amount of hardened concrete 40 in the mixer drum 2 is large. Hence, in the mixer truck 100 according to this invention, the driver is notified of the need to remove the concrete 40 on the basis of the magnitude of the rotation unevenness in the mixer drum 2.

When ready-mixed concrete adheres to the mixer drum 2 and hardens, further ready-mixed concrete adheres to the hardened concrete 40 and likewise hardens. The concrete 40 therefore adheres to the mixer drum 2 and hardens in specific parts thereof rather than over the entire periphery. Hence, when the mixer drum 2 is rotated in a condition where the hardened concrete 40 is adhered thereto, rotation unevenness occurs in the mixer drum 2.

Next, rotation unevenness in the mixer drum 2 will be described with reference to FIG. 4.

Figure 4:
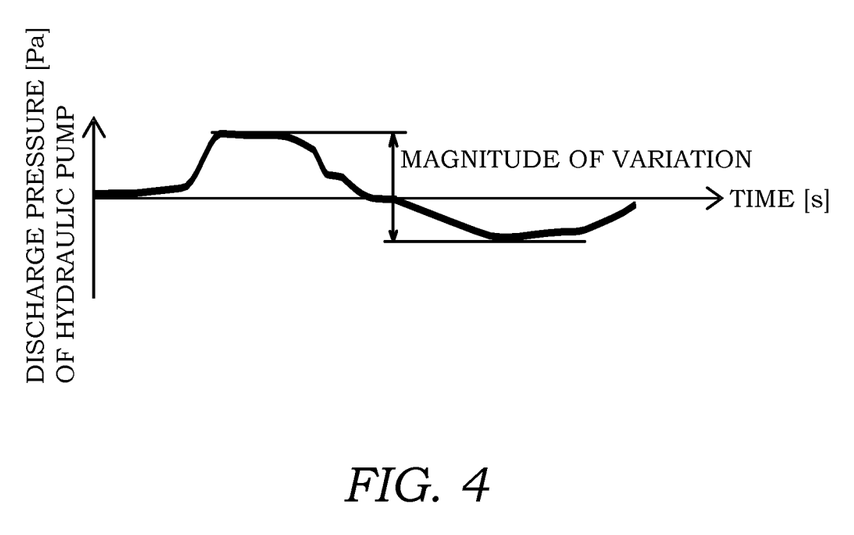
FIG. 4 is a graph illustrating an action of the mixer truck.

In FIG. 4, an abscissa shows time [s], and an ordinate shows the discharge pressure [Pa] of the hydraulic pump 5, detected by the pressure sensor 5a.

As shown in FIG. 4, when the ready-mixed concrete adheres to the interior of the mixer drum 2 and hardens, variation occurs in the discharge pressure of the hydraulic pump 5. More specifically, when the mixer drum 2 is rotated such that a part in which the concrete 40 has hardened ascends, a load increases, leading to an increase in the discharge pressure of the hydraulic pump 5. When the part in which the concrete 40 has hardened passes top dead center and begins to descend, on the other hand, the load decreases, leading to a reduction in the discharge pressure of the hydraulic pump 5.

The magnitude of the variation in the discharge pressure of the hydraulic pump 5 increases as the amount of hardened concrete 40 in the mixer drum 2 increases. In the mixer truck 100, therefore, a determination as to whether or not the amount of hardened concrete in the mixer drum 2 has reached an allowable value is made on the basis of the magnitude of the variation in the discharge pressure of the hydraulic pump 5.

A case in which the rotation sensor 6a is used as the driving condition detector is as follows.

When the ready-mixed concrete adheres to the interior of the mixer drum 2 and hardens, variation occurs in the rotation speed of the rotation sensor 6a. More specifically, when the part in which the concrete 40 has hardened passes a lowermost position and starts to ascend, the load increases, leading to a reduction in the rotation speed of the hydraulic motor 6. When the part in which the concrete 40 has hardened passes an uppermost position and starts to descend, on the other hand, the load decreases, leading to an increase in the rotation speed of the hydraulic motor 6.

The magnitude of the variation in the rotation speed of the hydraulic motor 6 increases as the amount of hardened concrete 40 in the mixer drum 2 increases. In the mixer truck 100, therefore, the determination as to whether or not the amount of hardened concrete in the mixer drum 2 has reached the allowable value is made on the basis of the magnitude of the variation in the rotation speed of the hydraulic motor 6.

Figure 5:
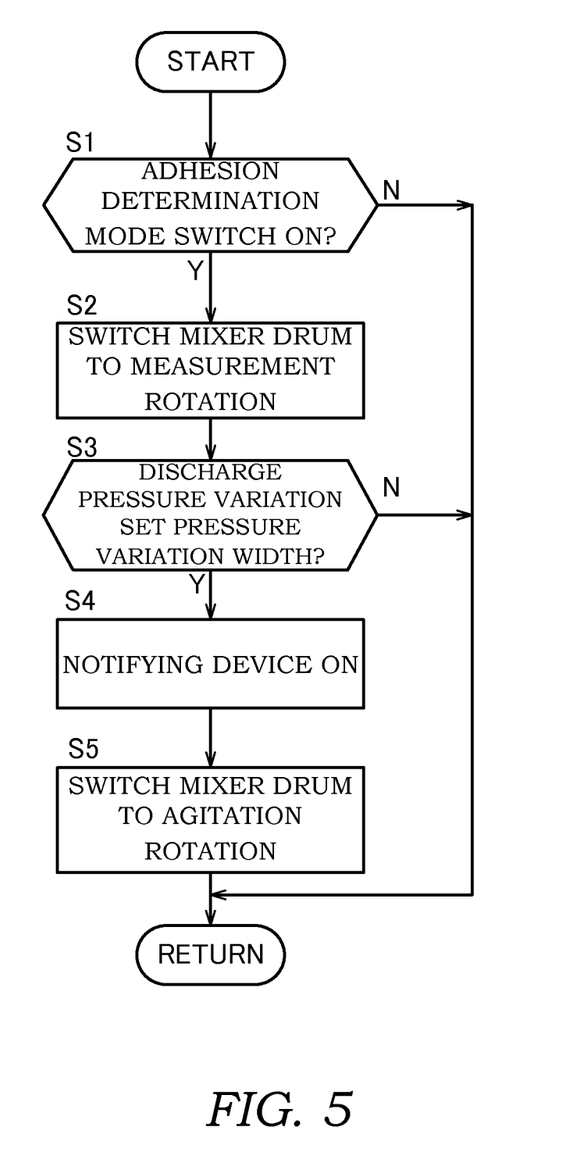
FIG. 5 is a flowchart showing a routine for notifying a driver that a magnitude of rotation unevenness in the mixer drum of the mixer truck has reached an allowable value.

Next, referring to FIG. 5, a routine executed in the mixer truck 100 by the controller 10 to notify the driver that the magnitude of the rotation unevenness in the mixer drum 2 has reached the allowable value will be described. The controller 10 executes this routine repeatedly at fixed time intervals of ten milliseconds, for example, while the engine 3 is operative. Here, only a case in which the pressure sensor 5a is used as the driving condition detector will be described, but similar control is executed in a case where the rotation sensor 6a is used as the driving condition detector.

The driver, after completely discharging the ready-mixed concrete in the mixer drum 2, washes the interior of the mixer drum 2 by introducing water. After completely discharging the washing water, the driver operates the adhesion determination mode switch 32d. In the mixer truck 100, therefore, a determination as to whether or not a magnitude of variation in the driving condition of the mixer drum 2 has reached an allowable value is made in a condition where the ready-mixed concrete in the mixer drum 2 has been completely discharged.

In a step S1, the controller 10 determines whether or not the adhesion determination mode switch 32d has been operated. When it is determined in the step S1 that the adhesion determination mode switch 32d has been operated, the routine advances to a step S2.

In the step S2, the controller 10 switches the mixer drum 2 to measurement rotation. Here, measurement rotation is rotation at a rotation speed where the rotation unevenness in the mixer drum 2 becomes apparent. The rotation speed of the mixer drum 2 during measurement rotation is set at a higher rotation speed than a rotation speed employed during agitation rotation. In so doing, a time required to measure the rotation unevenness in the mixer drum 2 can be shortened. It should be noted that the rotation speed of the mixer drum 2 during measurement rotation may be identical to or lower than the rotation speed employed during agitation rotation. The rotation unevenness in the mixer drum 2 can also be measured in these cases.

In a step S3, the rotation unevenness determination unit 15 determines whether or not the magnitude of the variation in the discharge pressure of the hydraulic pump 5, detected by the pressure sensor 5a, has reached the set pressure variation width. In so doing, the controller 10 can determine whether or not removal of the ready-mixed concrete adhered to the mixer drum 2 is required.

When it is determined in the step S3 that the magnitude of the variation in the discharge pressure of the hydraulic pump 5 has reached the set pressure variation width, the routine advances to a step S4. When it is determined in the step S3 that the magnitude of the variation in the discharge pressure of the hydraulic pump 5 has not reached the set pressure variation width, on the other hand, the routine returns.

In the step S4, the controller 10 notifies the driver from the notifying device 35 that the magnitude of the variation in the discharge pressure of the hydraulic pump 5 has reached the set pressure variation width, and therefore that the magnitude of the rotation unevenness in the mixer drum 2 has reached the allowable value. As a result, the driver is notified of the need to remove the ready-mixed concrete adhered to the mixer drum 2.

Hence, in the mixer truck 100, the driver is notified of the need to remove the concrete 40 on the basis of the magnitude of the rotation unevenness in the mixer drum 2. As a result, situations in which a removal operation is performed even though the amount of hardened concrete 40 in the mixer drum 2 is small or the mixer drum 2 continues to be used even though the amount of hardened concrete 40 in the mixer drum 2 is large can be prevented.

In a step S5, the rotation speed of the mixer drum 2 is switched from measurement rotation to agitation rotation.

Once the mixer drum 2 has been switched to agitation rotation, the determination as to whether or not the magnitude of the rotation unevenness in the mixer drum 2 has reached the allowable value is terminated, and the routine is returned.

According to the embodiment described above, following effects are obtained.

When the magnitude of the variation in the driving condition of the mixer drum 2 reaches the preset set value, the driver is notified from the notifying device 35 that the rotation unevenness of the mixer drum 2 has reached the allowable value. The magnitude of the variation in the driving condition of the mixer drum 2 increases as the amount of ready-mixed concrete adhered to the mixer drum 2 increases. Therefore, by determining whether or not the magnitude of the variation in the driving condition of the mixer drum 2 has reached the allowable value after the ready-mixed concrete in the mixer drum 2 has been completely discharged, a determination can be made as to whether or not the concrete 40 adhered to the mixer drum 2 needs to be removed. As a result, notification of the need to remove the concrete 40 adhered to the mixer drum can be provided.

Although the invention has been described above with reference to certain embodiments, the invention is not limited to the embodiments described above. Modifications and variations of the embodiments described above will occur to those skilled in the art, within the scope of the claims.

This application claims priority based on Japanese Patent Application No. 2011-191520 filed with the Japan Patent Office on Sep. 2, 2011, the entire contents of which are incorporated into this specification.

INDUSTRIAL APPLICABILITY

This invention can be applied to a mixer truck that transports ready-mixed concrete.

The embodiments of this invention in which an exclusive property or privilege is claimed are defined as follows:

1. A mixer truck having a mixer drum that is capable of carrying ready-mixed concrete, comprising:
   a driving device that is configured to drive the mixer drum to rotate using a fluid pressure of a working fluid;
   a driving condition detector that is configured to detect a driving condition of the mixer drum driven by the driving device;
   a controller that is configured to determine a magnitude of rotation unevenness in the mixer drum by comparing a magnitude of variation in the driving condition detected by the driving condition detector with a predetermined set value after the ready-mixed concrete in the mixer drum has been discharged; and
   a notifying device that is configured to notify a driver that the magnitude of the rotation unevenness in the mixer drum has reached an allowable value when the controller determines that the magnitude of the variation in the driving condition detected by the driving condition detector has reached the set value.

2. The mixer truck as defined in claim 1, wherein the driving condition detector is a pressure detector that is configured to detect a pressure of the working fluid in the driving device,
   the set value is a set pressure variation width, which is set in advance on the basis of the allowable value of the magnitude of the rotation unevenness in the mixer drum and serves as the magnitude of the variation in a working oil pressure detected by the pressure detector, and
   the controller determines whether or not the magnitude of the variation in the pressure, detected by the pressure detector as the mixer drum rotates, has reached the set pressure variation width.

3. The mixer truck as defined in claim 2, wherein the driving device includes:
   a fluid pressure pump that is configured to discharge the working fluid; and
   a fluid pressure motor that is configured to be driven by the working fluid discharged by the fluid pressure pump in order to drive the mixer drum to rotate, and
   the pressure detector is configured to detect a discharge pressure of the fluid pressure pump or a fluid pressure in the fluid pressure motor.

4. The mixer truck as defined in claim 1, wherein the driving device includes:
   a fluid pressure pump that is configured to discharge the working fluid; and
   a fluid pressure motor that is configured to be driven by the working fluid discharged by the fluid pressure pump in order to drive the mixer drum to rotate,
   the driving condition detector is a rotation speed detector that is configured to detect a rotation speed of the fluid pressure motor,
   the set value is a set rotation speed variation width, which is set in advance on the basis of the allowable value of the magnitude of the rotation unevenness in the mixer drum and serves as a magnitude of variation in the rotation speed of the fluid pressure motor, detected by the rotation speed detector, and
   the controller determines whether or not the magnitude of the variation in the rotation speed, detected by the rotation speed detector as the mixer drum rotates, has reached the set rotation speed variation width.

* * * * *